Patented Aug. 31, 1954

2,687,938

UNITED STATES PATENT OFFICE 2,687,938

TERNARY ACRYLONITRILE POLYMERS

David W. Chaney, Nether Providence Township, Delaware County, and Howard M. Hoxie, Chester, Pa., assignors to American Viscose Corporation, Wilmington, Del., a corporation of Delaware No Drawing. Application May 6, 1950, Serial No. 160,584

8 Claims. (Cl. 8—55)

This invention relates to new ternary copolymers having valuable properties and to shaped articles formed therefrom. This application is a continuation-in-part of our copending application Serial No. 73,662, filed January 29, 1949, now abandoned.

The copolymerization of a compound containing basic tertiary nitrogen with acrylonitrile is known to impart receptivity for the acid dyestuffs to the polymerized acrylonitrile. Copolymers consisting of acrylonitrile and from 2 to 10 percent of vinylpyridine have good receptivity for the dyestuffs.

The present invention provides new ternary copolymers of from 70 to 98 percent acrylonitrile, from 1 to 10 percent of a vinyl-substituted tertiary heterocyclic amine, and from 1 to 20 percent of vinyl acetate. It has been found that articles, such as fibers or films, formed from these new ternary copolymers have enhanced receptivity for the acid dyes and can be dyed to deeper, more intense shades than articles formed under the same conditions from copolymers consisting of acrylonitrile and an equivalent proportion of the vinyl-substituted tertiary heterocyclic amine. The increase in dye receptivity exhibited by the articles comprising the ternary polymers is obtained by the use of amounts of vinyl acetate which do not appreciably damage the other desirable physical properties, such as toughness, tenacity, thermal stability, etc., of articles comprising high acrylonitrile polymers.

The new ternary copolymers may be synthesized from mixtures of the monomers in the desired proportions, or by continuous addition of the mixed monomers to a suitable reactor maintained under polymerization conditions. The copolymerization may be performed in aqueous suspension preferably in the presence of an emulsifying agent. The suspension or emulsion may be attained by any agitation method, for example by tumbling the reactor, or through the use of any suitable stirring device. The polymerization is usually catalyzed by an oxygen-yielding peroxy catalyst and by heating to temperatures of from 40 to 100° C. When the polymerization is complete, the copolymer is separated from the unreacted monomer, if any, and from the aqueous suspension medium by any suitable procedure, for example by steam distillation. The copolymer may then be filtered and dried.

In carrying out the polymerization, a wide variety of the emulsifying agents may be used. In general, any composition having both hydrophilic and hydrophobic radicals may be used. The term "emulsifying agent" is intended to include commercial soaps made by the saponification of animal and vegetable oils, such as sodium stearate, potassium laurate, ammonium oleate, and mixtures of these and other salts as they occur in commercially available "soaps." Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts, such as stearyl dimethyl benzyl ammonium chloride, non-ionic emulsifiers, such as ethylene oxide adducts of hexitan monostearates, fatty acids, mercaptans and alcohols, and hexitan monostearates.

Suitable oxygen-yielding compounds which may be used to catalyze the polymerization are hydrogen peroxide, the organic peroxides such as benzyl peroxide, t-butyl hydroperoxide and acetyl peroxide, the organic percarbonates such as isopropyl percarbonates, and the inorganic peroxides such as sodium peroxide, sodium perborate, sodium persulfate and other water-soluble salts of the same or different peroxy acids. Azo catalysts, such as azo-2,2'-diisobutyronitrile may be used advantageously in the copolymerization. Only small proportions of the peroxy compounds are required and used. Generally, from 0.005 percent to 0.5 percent of the catalyst is sufficient. Larger proportions of the catalyst may be used if desired. The catalyst may be activated by the use of triethanolamine, sodium bisulfite, or other material which promotes the formation of free radicals, and when such activators are used, lower polymerization temperatures, for example temperatures in the range of 0 to 40° C. may be employed.

The new ternary copolymers may also be produced by a special solution polymerization in which the solution is saturated with a mixture of the monomers in predetermined ratio. The catalyst, or a portion thereof, is added and the copolymerization is conducted just at reflux temperature by continuously adding a mixture of the monomers in predetermined proportion corresponding to the proportion of the monomers in the initial copolymer, to the mass at such a rate as to keep the reflux temperature and rate substantially constant. In this manner, the desired uniform concentration of each monomer is maintained in the reactor and the products are substantially homogeneous with respect to both composition and molecular weight. The catalyst, in solution, may be added to the copolymerizing mass continuously at a controlled rate to maintain the catalyst constant throughout the reaction.

The copolymerization may be conducted in the presence of molecular weight regulators which act as chain terminators and prevent the formation of very large molcular weight increments. Such regulators are exemplified in the high molecular weight aliphatic mercaptans, such as dodecyl mercaptan, dithioglycidol and in carbon tetrachloride.

The vinyl-substituted tertiary heterocyclic amines which may be copolymerized with the acrylonitrile and the vinyl acetate to produce the ternary polymers of the invention include the various isomeric vinylpyridines such as 2-vinylpyridine, 3-vinylpyridine, and 4-vinylpyridine, the vinyl-substituted alkyl pyridines such as 4-ethyl-2-vinylpyridine, 5-ethyl-2-vinylpyridine, 4-methyl-3-vinylpyridine, 5-ethyl-3-vinylpyridine, 4,6-dimethyl-2-vinylpyridine, 2-methyl-5-vinylpyridine, and 6-methyl-2-vinylpyridine, the isomeric vinylpyrazines, the isomeric vinylquinolines, the vinyl oxazoles, the vinyl imidazoles, and the vinyl benzoxazoles.

The proportion of the vinyl acetate in the ternary polymer may be varied within the range of 1 to 20 percent.

The ternary copolymers may be fabricated into filaments by dry spinning procedures. They may also be wet-spun by extruding a solution of the copolymer in a suitable solvent into a coagulating bath comprising a liquid which is inert to the copolymer and an extractive for the spinning solvent. Solutions of from 5 to 20 percent of the ternary copolymer in the selected solvent may be used.

The ternary copolymers are soluble in various solvents. In general, the ternary copolymers are soluble in the solvents for copolymers consisting of acrylonitrile and the vinyl-substituted heterocyclic tertiary amine. The following are examples of solvents which may be used: N,N-dimethylformamide, N,N-dimethylacetamide, dimethyl sulfone, N-formylmorpholine, N-isopropyl-N-cyanomethylformamide, tetramethylene sulfoxide, and succinonitrile.

The coagulating bath may be, for example, a mixture of water and the spinning solvent, for example a mixture of water and dimethylacetamide, or a mixture of water and dimethylformamide, or it may be glycerol, a mixture of predominantly aromatic hydrocarbons such as the mixture available commercially under the trade designation Solvesso-100, isopropanol, etc.

The filaments formed in the coagulating baths are subjected to stretching operations for improvement in their tensile strength and elongation. This stretching may precede or follow washing to remove residual spinning solvent, or it may be performed concurrently with washing. Any suitable thread stretching device may be used. The fibers may be stretched on godets at a comparatively low temperature, for example from room temperature to 100° C. and subsequently after-stretched at elevated temperatures, or they may be stretched at elevated temperatures directly after leaving the coagulating bath. The stretched, oriented fibers may be stabilized by subjecting them to a heat treatment in a relaxed condition. For example, the fibers may be exposed to hot air or hot water in a relaxed, free-to-shrink condition, at temperatures of 90° C. to 180° C., and after the heat-treatment the fibers exhibit increased resistance to boiling water.

Instead of fibers, other shaped articles such as films, foils, sheets, casings, tubes, rods, etc. may be made.

Further details of the invention are set forth in the following examples in which the parts are by weight unless otherwise stated.

*Example I*

To 3000 parts of water there were added 90 parts of acrylonitrile, 10 parts of vinyl acetate, and 0.5 part of 2-vinyl pyridine. The solution was brought to reflux at 83° C., and 8.6 parts of potassium persulfate were added. As soon as copolymerization was initiated, the continuous addition of a mixture consisting of 460 parts of acrylonitrile, 20 parts of 2-vinylpyridine, and 20 parts of vinyl acetate was started. The mixture was added continuously during the course of the copolymerization at a controlled rate to maintain the temperature and rate of reflux substantially constant. Polymerization time: 1 hour. Yield, 512 parts. On analysis, the ternary polymer was found to contain about 92% of acrylonitrile, 4.0% of 2-vinylpyridine and 4.5% of vinyl acetate. The polymer had a specific viscosity of 0.166 in a concentration of 0.1 gm. in 100 ml. of dimethylformamide.

A standardized dye bath was prepared by dissolving 5% of Glauber's salt, 3% of surlfuric acid (96%) and 2% of the acid dye Wool Fast Scarlet G Supra (percentages on the weight of the fibers or other articles to be dyed) in water. The articles to be dyed were entered into the bath at 55° C., the bath was brought to the boil in 10 minutes and boiled for 20 minutes.

Films cast from a dimethylacetamide solution of the ternary polymer were dyed in this dyebath in the manner specified. The film dyed to a deeper shade of red than films formed from a copolymer consisting of 96.2% acrylonitrile and 3.8% 2-vinylpyridine, and from a copolymer of 95% acrylonitrile and 5% vinylpyridine, under the same conditions.

*Example II*

A series of ternary polymers were prepared by the continuous addition of 450 grams of a mixture of acrylonitrile, 2-vinylpyridine and vinylacetate (in relative proportions corresponding to the relative proportions thereof in the copolymer molecule) to an aqueous medium containing 1 percent of potassium persulfate, 0.2 percent of tertiary dodecyl-mercaptan, and 0.1 percent of a formaldehyde - condensed naphthalene - sulfonic acid, based on the monomers added. The copolymerization was conducted at reflux, at a water:monomer ratio of 2:1, the mixed monomers being added over a period of two hours at a controlled rate to maintain substantially uniform polymerizing conditions.

The ternary polymers obtained had the following compositions:

|  | Percent | | | |
| --- | --- | --- | --- | --- |
| Acrylonitrile | 92 | 93 | 92 | 94 |
| 2-vinylpyridine | 6 | 5 | 4 | 4 |
| vinyl acetate | 2 | 2 | 4 | 2 |

Separate solutions of the several ternary polymers in dimethylacetamide were prepared and spun into fibers, which were dried and then stretched under heating for orientation. The oriented fibers were dyed in a dyebath as described in Example I. At the same time, fibers produced under the same conditions from acrylonitrile-2-vinylpyridine copolymers containing the same amount of 2-vinylpyridine, which copolymers were produced under the same polymerization conditions as the ternary polymers, were dyed in the same dyebath. The results of a comparison of the time required for the fibers of the ternary polymers to exhaust the dyebath, in contrast to the time required by the fibers of the acrylonitrile-2-vinylpyridine copolymer, are shown in the following table:

| Acrylonitrile......percent.. | 94 | 95 | 96 | 92 | 93 | 92 |
|---|---|---|---|---|---|---|
| 2-vinylpyridine......do.... | 6 | 5 | 4 | 6 | 5 | 4 |
| vinyl acetate.........do.... | 0 | 0 | 0 | 2 | 2 | 4 |
| Hours.................... | 2.5 | 2.5 | 2.5 | 1.25 | 2.75 | 2.5 |
| Dyebath Exhaustion .do.... | 100 | 50 | 50 | 100 | 100 | 100 |

The invention is defined in the appended claims.

We claim:

1. A ternary copolymer of, by weight, (1) from 70 to 98 percent of acrylonitrile, (2) from 1 to 10 percent of a vinyl-substituted tertiary heterocyclic amine and (3) from 1 to 20 percent of vinyl acetate.

2. As an article of manufacture, an oriented fiber comprising a ternary copolymer of, by weight, (1) from 70 to 98 percent of acrylonitrile, (2) from 1 to 10 percent of a vinyl-substituted tertiary heterocyclic amine and (3) from 1 to 20 percent of vinyl acetate.

3. A ternary copolymer of, by weight, (1) about 92 percent of acrylonitrile, (2) 6 percent of 2-vinyl pyridine, and (3) 2 percent of vinyl acetate.

4. A shaped article having one dimension large relative to another of its dimensions and composed of the ternary copolymer of claim 3.

5. A ternary copolymer of, by weight, (1) about 92 percent of acrylonitrile, (2) about 4 percent of 2-vinylpyridine, and (3) about 4 percent of vinyl acetate.

6. A shaped article having one dimension large relative to another of its dimensions and composed of the ternary copolymer of claim 5.

7. As an article of manufacture, an oriented fiber comprising a ternary copolymer of, by weight, (1) about 92 percent of acrylonitrile, (2) about 4 percent of 2-vinylpyridine, and (3) about 4 percent of vinyl acetate.

8. As an article of manufacture, an oriented fiber comprising a ternary copolymer of, by weight, (1) about 92 percent of acrylonitrile, (2) about 4 percent of 2-vinylpyridine, and (3) about 4 percent of vinyl acetate, said fiber being dyed with an acid dye.

References Cited in the file of this patent

UNITED STATES PATENTS

| Number | Name | Date |
|---|---|---|
| 2,402,020 | Cislak et al. | June 11, 1946 |
| 2,462,354 | Brubaker | Feb. 22, 1949 |
| 2,471,959 | Hunt | May 31, 1949 |
| 2,478,378 | Dickey | Aug. 9, 1949 |
| 2,491,471 | Arnold | Dec. 20, 1949 |
| 2,583,327 | D'Alelio | Jan. 22, 1952 |
| 2,592,107 | Azorlosa | Apr. 8, 1952 |
| 2,601,251 | Bruson | June 24, 1952 |

FOREIGN PATENTS

| Number | Country | Date |
|---|---|---|
| 597,368 | Great Britain | Jan. 23, 1948 |